United States Patent
Ballweg

(10) Patent No.: US 10,381,898 B2
(45) Date of Patent: Aug. 13, 2019

(54) ELECTRIC MACHINE HAVING A STATOR AND METHOD THEREOF FOR PRODUCING A STATOR OF THIS TYPE

(71) Applicant: Siemens Aktiengesellschaft, München (DE)

(72) Inventor: Marion Ballweg, Bundorf (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 16/064,929

(22) PCT Filed: Nov. 9, 2016

(86) PCT No.: PCT/EP2016/077054
§ 371 (c)(1),
(2) Date: Jun. 21, 2018

(87) PCT Pub. No.: WO2017/108254
PCT Pub. Date: Jun. 29, 2017

(65) Prior Publication Data
US 2019/0006910 A1    Jan. 3, 2019

(30) Foreign Application Priority Data

Dec. 22, 2015  (EP) .................................... 15202002

(51) Int. Cl.
| H02K 15/12 | (2006.01) |
| H02K 5/24 | (2006.01) |
| H02K 3/30 | (2006.01) |
| H02K 3/34 | (2006.01) |
| H02K 1/16 | (2006.01) |
| H02K 3/12 | (2006.01) |
| H02K 15/02 | (2006.01) |

(Continued)

(52) U.S. Cl.
CPC ................. *H02K 5/24* (2013.01); *H02K 1/16* (2013.01); *H02K 3/12* (2013.01); *H02K 3/30* (2013.01); *H02K 3/34* (2013.01); *H02K 15/024* (2013.01); *H02K 15/085* (2013.01); *H02K 15/10* (2013.01); *H02K 15/12* (2013.01)

(58) Field of Classification Search
CPC ........ H02K 15/00; H02K 15/12; H02K 15/14; H02K 15/24
USPC ................................................ 310/43–45, 51
See application file for complete search history.

(56) References Cited

U.S. PATENT DOCUMENTS

| 3,014,980 A | 12/1961 | Marshall et al. |
| 8,729,756 B2 * | 5/2014 | Eguchi ................ F04D 13/0606 310/43 |
| 2005/0204544 A1 | 9/2005 | Aisenbrey |

(Continued)

FOREIGN PATENT DOCUMENTS

| DE | 10 2008 049 555 A1 | 4/2010 |
| DE | 10 2009 012 478 A1 | 9/2010 |

(Continued)

*Primary Examiner* — Tran N Nguyen
(74) *Attorney, Agent, or Firm* — Henry M. Feiereisen LLC

(57) ABSTRACT

The invention relates to an electric machine (1) having a stator (2), with magnetic-field-conductive material, in which substantially axial grooves (4) are positioned, wherein a winding system (3), which is surrounded and/or penetrated by impregnating resin, is provided in the grooves, wherein the impregnating resin has energy-absorbing particles (7).

7 Claims, 2 Drawing Sheets

(51) Int. Cl.
*H02K 15/085* (2006.01)
*H02K 15/10* (2006.01)

(56) References Cited

U.S. PATENT DOCUMENTS

2007/0145842 A1* 6/2007 Zhu ................ F04D 29/582
                                                        310/88
2017/0012481 A1 1/2017 Ballweg

FOREIGN PATENT DOCUMENTS

JP          57062742    *  4/1982  ............... H02K 5/24
RU         106055  U1    6/2011

* cited by examiner

ELECTRIC MACHINE HAVING A STATOR AND METHOD THEREOF FOR PRODUCING A STATOR OF THIS TYPE

CROSS-REFERENCES TO RELATED APPLICATIONS

This application is the U.S. National Stage of International Application No. PCT/EP2016/077054, filed Nov. 9, 2016, which designated the United States and has been published as International Publication No. WO 2017/108254 and which claims the priority of European Patent Application, Serial No. 15202002.0, filed Dec. 22, 2015, pursuant to 35 U.S.C. 119(a)-(d).

BACKGROUND OF THE INVENTION

The invention relates to an electric machine having a stator, in the grooves of which a winding system is arranged, a method for producing such a stator of an electric machine and the use of such electric machines.

The winding system of electric machines in the stator and/or rotor is exposed to electromagnetic excitations of oscillations, which because the winding system is permanently fixed inside the groove by corresponding casting compounds and impregnating resins in the active components of the electric machine, in other words the stator and/or rotor, are emitted to said active components and thus ultimately to the environment.

When a dynamoelectric machine, for example, is operated on an inverter, such excitations of oscillations occur more frequently. An attempt is made to combat this, in that said electric machines for example have soundproofing mats on the housing, to reduce corresponding noise emissions. One disadvantage of this is that in consequence the dimensions of the dynamoelectric machine increase and/or flows of cool air inside the dynamoelectric machine are impeded.

SUMMARY OF THE INVENTION

Based on this, the object of the invention is to create an electric machine, in particular a dynamoelectric machine, which in particular reduces noise emissions even during inverter operation of the dynamoelectric machine.

The object is achieved by an electric machine having a stator, with magnetic-field-conductive material, in which substantially axial grooves are positioned, wherein a winding system is provided in the grooves which is surrounded and/or penetrated by impregnating resin, wherein the impregnating resin has energy-absorbing particles.

The object is likewise achieved by a method for producing an electric machine having a stator and/or rotor by the following steps:
  provision of a magnetic-field-conductive body with grooves,
  insertion of a winding system,
  impregnation/casting of the winding system by means of an impregnating resin or casting material to which particles are added.

According to the invention the object of reducing the noise emissions is now achieved in that the oscillating winding systems, in other words in particular the individual wires or electrical conductors, are embedded into an impregnating resin or a casting compound which has energy-absorbing particles. This prevents such oscillations propagating onto the adjacent magnetic-field-conductive material, in particular the laminated cores of the stator and/or rotor of the dynamoelectric machine and correspondingly emitting noise to the environment.

In one configuration the particles are in particular embodied as thread-shaped, in order thereby to enable their orientation within the groove between the individual conductors and/or the conductors and the surrounding magnetic-field-conductive material to be effected. In this case an orientation is preferred which is particularly energy-absorbing, in other words in the case of thread-shaped particles these are for example embodied either in the form of microscrews or skeins. These arrangements of the thread-shaped particles reinforce the energy-absorbing effect.

The particles, in particular including nanoparticles, in other words particles which are less than 100 nanometers in extent, are advantageously arranged homogeneously within the impregnating resin.

Otherwise these thread-shaped particles have a linear expansion of up to a few millimeters, with corresponding diameters of a few micrometers. In particular in the case of shorter particles the diameter can be reduced down to a few nanometers.

However, if oscillation loops occur more frequently at especially oscillatory regions of the winding and result in noise emissions, these particles can also be provided more frequently there during the production process.

BRIEF DESCRIPTION OF THE DRAWING

The invention and advantageous embodiments of the invention are described in greater detail on the basis of the following drawings, in which.

DETAILED DESCRIPTION OF PREFERRED EMBODIMENTS

Figure 1:
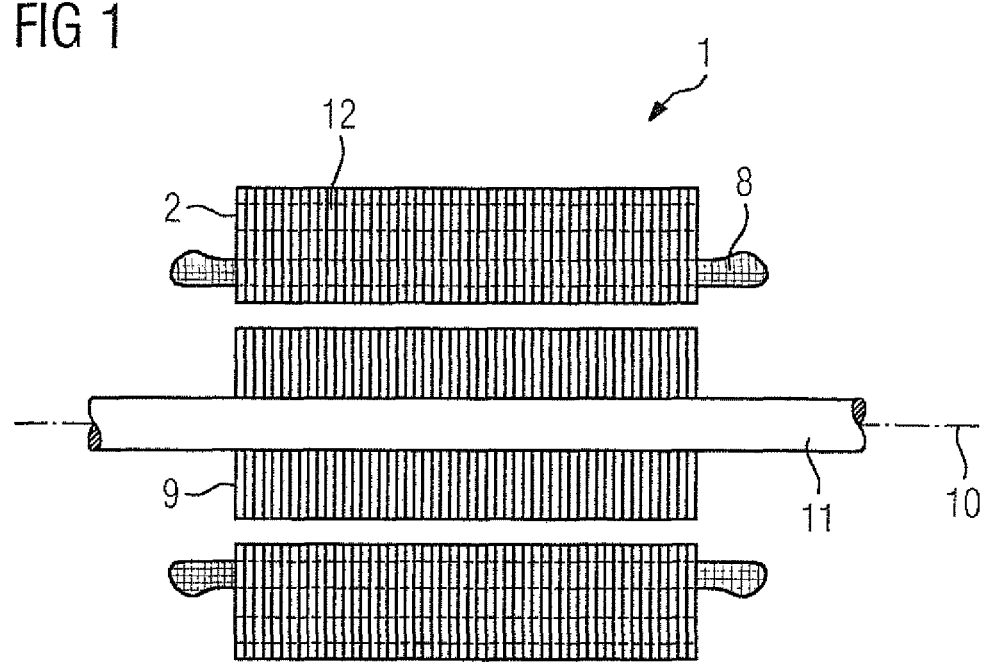
FIG. 1 shows a basic longitudinal section of an electric machine.

FIG. 1 shows a basic representation of an electric machine 1 having a stator 2, which in this embodiment has a laminated core 12, wherein the magnetic-field-conductive component can also be provided as a single-piece material, e.g. as a composite material. Arranged in this magnetic-field-conductive material 12 are substantially axial grooves 4, in which the winding system 3 is accommodated and which forms winding overhangs 8 on the end faces of the stator 2. By way of corresponding electromagnetic interactions with a rotor 9 said rotor 9 rotates about an axis 10 and can thereby drive a driven machine via a shaft 11.

Figure 2:
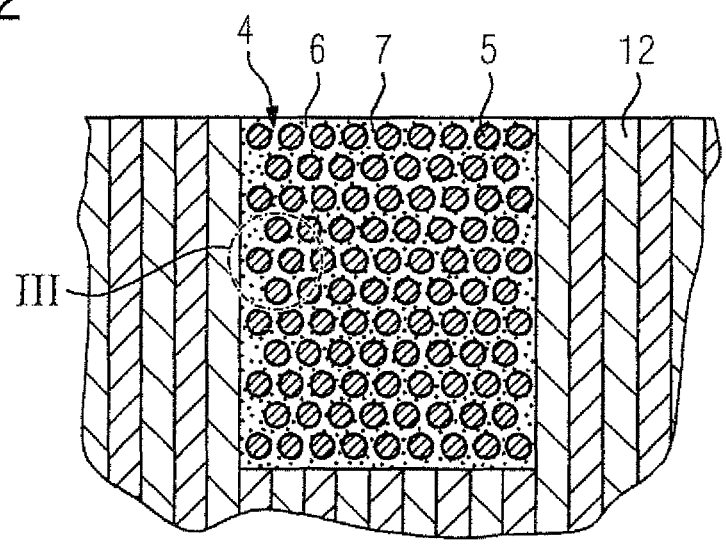
FIG. 2 shows a cross-section from the magnetic-field-conductive material of the stator.

FIG. 2 shows a groove 4 in a segment of the magnetic-field-conductive material, i.e. for example of the laminated core 12, into which groove 4 a coil of the winding system 3 is inserted, wherein the coil consists of a plurality of individual wires 5. The wires 5 are spaced apart from one another, into which spaces the impregnating resin is filled using correspondingly appropriate methods, in order thereafter to form a permanent bond with the magnetic-field-conductive laminated core 12 when cured. Particles 7 which are embodied as energy-absorbing are now arranged inside the impregnating resin between the wires 5 and/or also between the wires 5 and the groove wall 4. In this case the particles 7 originally present, in particular in the shape of a thread, are now present in the impregnating resin in oscillation-absorbing form as a result of a physical or chemical process during the impregnation process or thereafter, in other words as a skein-like, helical or spherical entity.

The processes used in this case can for example be a special heat treatment and/or a catalytically initiated process in the impregnating resin 6, which results in an energy-absorbing shape for the particles 7.

Figure 3:
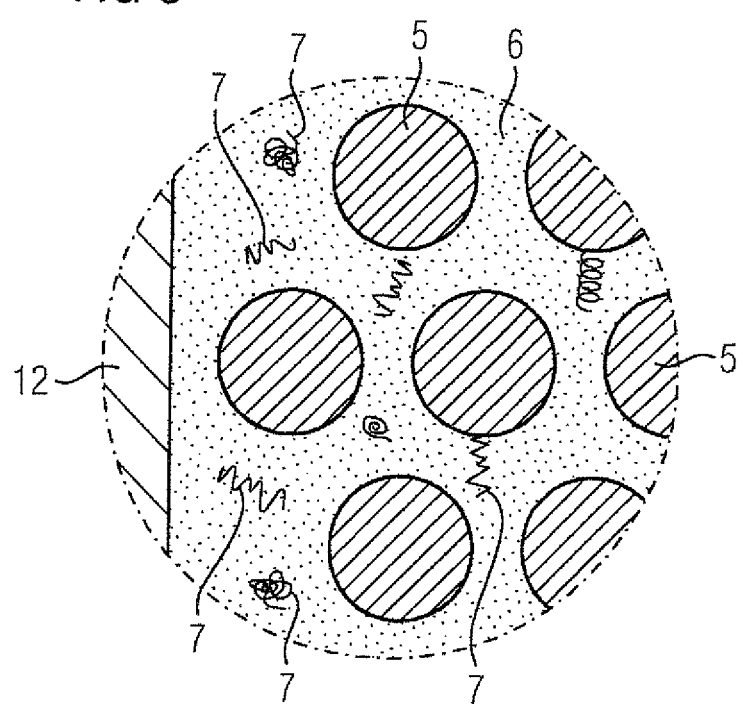
FIG. 3 shows a detailed view.

These particles 7 are then embodied as spiral, spherical, zigzag-shaped or skein-like, as they are represented in principle in FIG. 3.

The invention in this case is not restricted to the application to active components of dynamoelectric machines 1, such as the stators and/or rotors of motors or generators, but is also suitable for other electric machines, such as e.g. transformers.

The areas of application of corresponding dynamoelectric machines are for example traffic engineering, such as drive motors of rail vehicles and e-cars, drives in industrial engineering.

The invention claimed is:

1. A method for producing an electric machine, comprising:
   providing a magnetic-field-conductive body with grooves;
   inserting a winding system into the grooves of the magnetic-field-conductive body; and
   impregnating the winding system with an impregnating resin containing substantially thread-shaped particles, wherein the particles in the impregnating resin forming, during or after impregnation of the winding system, a plurality of oscillation-absorbing structures, within the impregnating resin, by a physical and/or chemical process, such that the substantially-thread-shaped particles assume a spiral, helical, spherical, zigzag-shaped or skein configuration.

2. The method of claim 1, further comprising allowing the impregnating resin to cure, with the particles being dispersed within the cured impregnating resin homogeneously or in accordance with a predefined distribution.

3. The method of claim 2, wherein the particles are arranged at oscillation loops of the winding system.

4. An electric machine, comprising:
   a stator having a magnetic-field-conductive material with substantially axial grooves;
   a winding system received in the grooves; and
   impregnating resin surrounding and/or penetrating the winding system, said impregnating resin containing oscillation-absorbing substantially-thread-shaped particles that are formed into a spiral, helical, spherical, zigzag-shaped or skein configuration for absorbing oscillation.

5. The electric machine of claim 4, wherein the particles are arranged on sections or components of the magnetic-field-conductive material that are subjected to oscillation.

6. The electric machine of claim 4, wherein the particles are arranged within the impregnating resin homogeneously or in accordance with a predefined distribution.

7. The electric machine of claim 4, for use in a drive in industry and in traffic engineering, as well as in power engineering in a generator or transformer.

* * * * *